United States Patent [19]

Crosbie et al.

[11] Patent Number: 5,171,557
[45] Date of Patent: Dec. 15, 1992

[54] METHOD FOR SILICON NITRIDE PRECURSOR SOLIDS RECOVERY

[75] Inventors: Gary M. Crosbie, Dearborn; Ronald L. Predmesky, Livonia; John M. Nicholson, Wayne, all of Mich.

[73] Assignee: Ford Motor Company, Dearborn, Mich.

[21] Appl. No.: 706,509

[22] Filed: May 28, 1991

[51] Int. Cl.⁵ .................. C01B 33/00; B01D 47/00
[52] U.S. Cl. ........................... 423/344; 55/42; 55/457; 366/339; 423/324; 423/371
[58] Field of Search .............. 423/344, 324, 351, 371; 366/336, 339; 55/41, 42, 456, 457

[56] References Cited

U.S. PATENT DOCUMENTS

| | | | |
|---|---|---|---|
| R. 31,788 | 1/1985 | Iwai et al. | 423/290 |
| 3,028,227 | 4/1970 | Ballestra | 423/324 |
| 3,704,006 | 11/1972 | Grout et al. | 366/339 |
| 4,196,178 | 4/1962 | Iwai et al. | 423/290 |
| 4,224,288 | 9/1980 | Potter | 423/123 |
| 4,387,079 | 6/1983 | Kasai et al. | 423/344 |
| 4,448,540 | 5/1984 | McLeod | 366/160 |
| 4,641,705 | 2/1987 | Gorman et al. | 165/85 |
| 4,656,300 | 4/1987 | Lebrun et al. | 556/412 |
| 4,660,986 | 4/1987 | Leschonski et al. | 366/154 |
| 4,686,095 | 8/1987 | Beckwith et al. | 423/324 |
| 4,732,585 | 3/1988 | Lerner | 55/90 |
| 4,732,746 | 3/1988 | Crosbie et al. | 423/324 |
| 4,818,495 | 4/1989 | Iya | 422/145 |
| 4,859,443 | 8/1989 | Marosi | 423/344 |
| 4,878,925 | 11/1989 | Kojima | 55/235 |

FOREIGN PATENT DOCUMENTS 0009279 1/1977 Japan .................. 366/339

OTHER PUBLICATIONS

G. M. Crosbie et al, "Prepilot Scale Synthesis of Silicon Nitride under Pressure," *Ceramic Bulletin,* 68 (5) 1010 (1989).
G. M. Crosbie et al, "Synthesis of High Purity Sinterable Si₃N₄ Powders," *Ceramic Technology for Advanced Heat Engines Final Report,* ORNL/Sub/85-SB012/1, Oak Ridge National Laboratory, Oak Ridge, Tenn., Aug. 1990.

*Primary Examiner*—Olik Chaudhuri
*Assistant Examiner*—Ken Horton
*Attorney, Agent, or Firm*—Damian Porcari; Roger L. May

[57] ABSTRACT

Method and apparatus are provided for collecting reaction product solids entrained in a gaseous outflow from a reaction situs, wherein the gaseous outflow includes a condensable vapor. A condensate is formed of the condensable vapor on static mixer surfaces within a static mixer heat exchanger. The entrained reaction product solids are captured in the condensate which can be collected for further processing, such as return to the reaction situs. In production of silicon imide, optionally integrated into a production process for making silicon nitride caramic, wherein reactant feed gas comprising silicon halide and substantially inert carrier gas is reacted with liquid ammonia in a reaction vessel, silicon imide reaction product solids entrained in a gaseous outflow comprising residual carrier gas and vaporized ammonia can be captured by forming a condensate of the ammonia vapor on static mixer surfaces of a static mixer heat exchanger.

29 Claims, 2 Drawing Sheets

METHOD FOR SILICON NITRIDE PRECURSOR SOLIDS RECOVERY

GOVERNMENT INTEREST

This invention was made with Government support under Contract No. 86X-22001C (Martin Marietta Energy Systems, Inc., ORNL) awarded by the Department of Energy.

FIELD OF THE REACTION

The present invention relates to collecting reaction product solids entrained in a gaseous outflow from a reaction site. The invention is particularly useful in the recovery of silicon nitride precursor solids entrained in a gaseous outflow of ammonia and inert carrier gas from a reactor vessel containing liquid ammonia and receiving a sustained flow of silicon halide reactant vapor and inert carrier gas.

BACKGROUND OF THE INVENTION

In a chemical production process in which reaction product solids are formed in a reactor vessel, a gaseous outflow from the reactor vessel may be exhausted to accommodate a continuing inflow of reactant feed gas during the reaction, the feed gas possibly including a large volume of inert carrier gas. Reaction product solids may become entrained in the gaseous outflow, particularly where agitation of the reactants is provided. If the portion of the reaction product entrained in the gaseous outflow is not recovered, the effective yield of the reaction is reduced, productivity is decreased and production costs are increased.

Reduced product yield through loss of reaction product solids entrained in a gaseous outflow from the reactor vessel is encountered, for example, in a known production process for silicon nitride precursor. Silicon nitride-based ceramics are considered amongst the toughest of the monolithic ceramics for use above 1000° C. The toughness is thought to be due primarily to a high degree of grain interlocking which can be developed from appropriate powders. Silicon nitride-based ceramics can be formed to near-net shape in a pressureless sintering operation from powders having the necessary characteristics. Silicon nitride ceramics are, therefore, prime candidates for light weight engine components, for example, in which toughness is needed together with high temperature wear resistance.

The above mentioned method for making silicon nitride precursor is taught in U.S. Pat. No. 4,732,746 to Crosbie et al. The Crosbie et al patent is directed particularly to production of silicon imide solids as a silicon nitride precursor. To prevent or reduce carbon contamination, an inert carrier gas, preferably nitrogen or argon, is used to bring silicon halide, preferably $SiCl_4$, vapor into contact with liquid ammonia. The reaction produces a mixture of precipitated silicon imide in liquid ammonia having dissolved ammonium halide. The silicon halide vapor is brought into reaction with the liquid ammonia by means of providing a sustained inflow to the reaction situs of a reactant feed gas comprising silicon halide vapor and the inert carrier gas. A gaseous outflow comprising primarily residual carrier gas and a certain amount of vaporized ammonia is released from the reaction situs to accommodate the continuing inflow of fresh reactant feed gas. The reaction situs preferably is agitated during the reaction. A certain fraction of the silicon nitride precursor precipitate may be entrained in the gaseous outflow from the reaction situs. The loss of such entrained solids reduces the effective reaction yield.

It would be desirable in numerous reaction schemes and production processes, including particularly, for example, the production of silicon nitride precursor in accordance with the Crosbie et al patent, wherein reaction product solids become entrained in a gaseous outflow from a reaction situs, to recover such reaction product solids. This and other objects and advantages of the present invention will be better understood from the following disclosure and discussion of the invention.

SUMMARY OF THE INVENTION

In accordance with the invention, method and apparatus are provided for collecting solids, such as reaction product solids, entrained in a gas flow comprising condensable vapor. In the case of a gaseous outflow from a reaction situs during a reaction, the gaseous outflow comprises vapor condensable at a reduced temperature, that is, at a condensation temperature lower than the temperature at which it exits the reaction vessel. The gaseous outflow is passed from an outlet of the reactor vessel to a static mixer heat exchanger. The static mixer heat exchanger has a static mixer cooling chamber defining a flow path for the gaseous outflow between the inlet and an outlet. Static mixer surfaces are provided in the flow path of the static mixer cooling chamber for capturing the entrained solids in a condensate formed of the aforesaid condensable vapor. Specifically, the static mixer heat exchanger further provides cooling means for maintaining the static mixer surfaces at a temperature not greater than the aforesaid reduced temperature at which the condensable gas condenses. Entrained reaction product solids in a gaseous outflow contact, and are thereby captured in, the condensate formed on the static mixer surfaces. The condensate and the reaction product solids captured therein can be collected, for example, for return to the reactor vessel or for other processing.

The present invention provides advantages in collecting or recovering reaction product solids which may otherwise be lost or which would otherwise require different, more expensive or difficult collection methods and apparatus. Such collection of reaction product solids will in many instances increase the effective reaction product yield, thereby improving the efficiency of the production process.

In addition, in those embodiments of the invention wherein the condensate formed in the static mixer heat exchanger comprises reactant for the ongoing reaction, the return of the condensate, with the recovered reaction product solids, can further improve the efficiency of the production process. This is particularly true where the reactant in the condensate would otherwise be lost or require more expensive or difficult collection and return apparatus.

The method and apparatus of the invention are particularly advantageous in preferred embodiments of the invention, discussed further below, wherein silicon nitride precursor solids are entrained in a gaseous outflow from a reaction situs during an ongoing reaction. The static mixer heat exchanger can treat gaseous outflow from the reaction situs anaerobically, including steps of receiving the gaseous outflow, forming a condensate of a condensable vapor in the gaseous outflow to capture entrained solids, and returning the condensate, optionally through intermediate fluid communication means, to the reaction situs or other receiving point for further processing. In such preferred embodiments the invention is particularly advantageous in that the entrained solids comprise reaction product, thus directly enhancing process yield, and the condensate returned with the solids to the ongoing reaction is usable reactant.

These and additional features and advantages will be better understood in the light of the following detailed description of certain preferred embodiments of the invention.

DETAILED DESCRIPTION OF PREFERRED EMBODIMENTS

Figure 1:
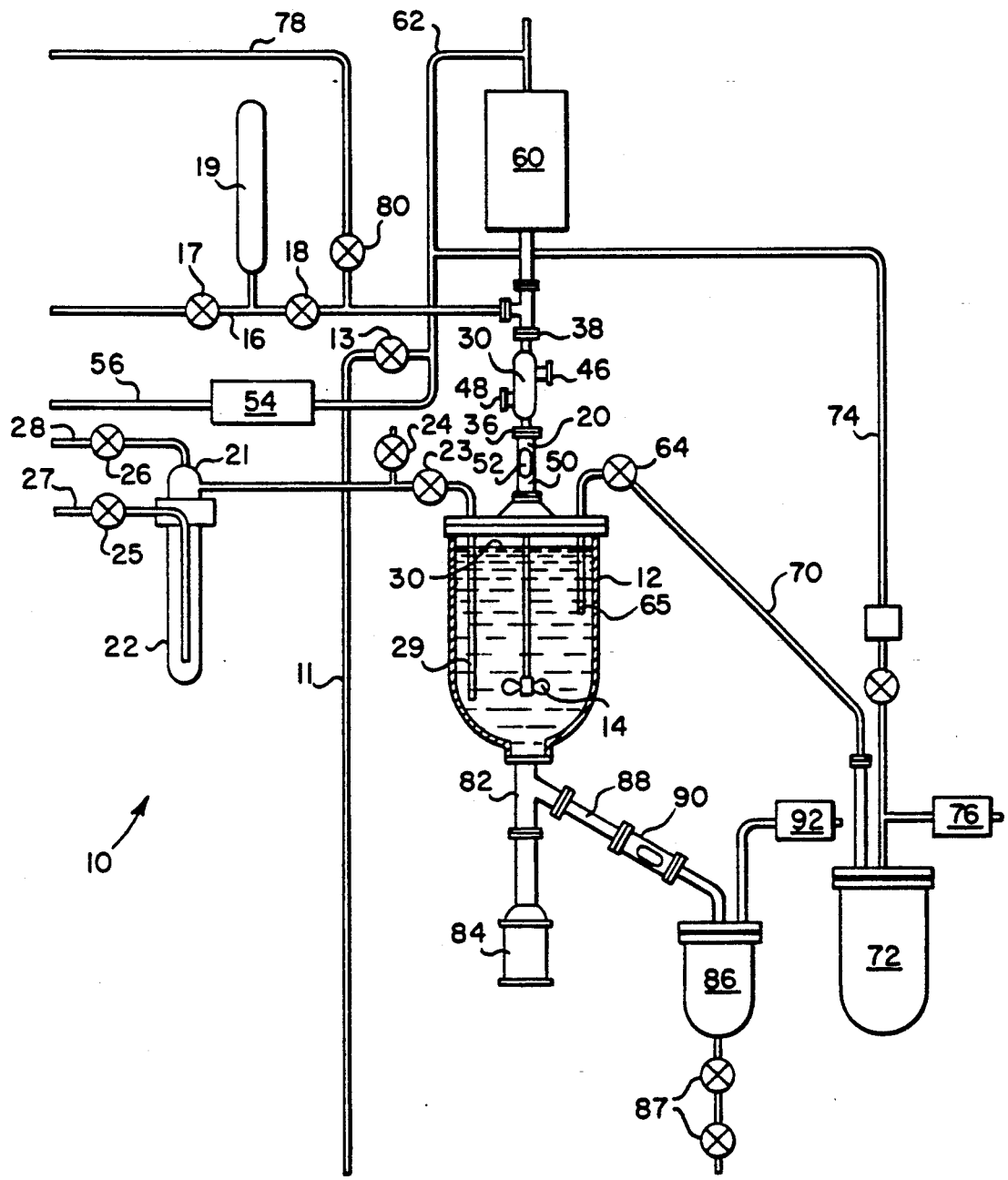
FIG. 1 is a schematic illustration of apparatus in accordance with a preferred embodiment of the invention for carrying out a reaction for the production of silicon nitride precursor solids, wherein precursor solids are recovered and returned anaerobically to the reaction situs in a condensate of reactant vapor formed by a static mixer heat exchanger treating a gaseous outflow from the reaction situs.

The method and apparatus of the invention for recovering reaction product solids entrained in a gaseous outflow from a reaction situs is described below in connection with certain particularly preferred embodiments of the invention involving the production of silicon nitride precursor solids. It will be understood by those skilled in the art, however, that the invention has broader application in accordance with the general principles illustrated by such preferred embodiments. In particular, the invention is illustrated below in connection with the method and apparatus for making silicon nitride precursor disclosed in U.S. Pat. No. 4,732,746 to Crosbie et al, which disclosure is incorporated herein by reference, as noted above. More specifically, the particularly preferred embodiment of the invention now described involves a low temperature reaction between silicon tetrachloride vapor and liquid ammonia under pressure. Ammonium chloride triammoniate is produced along with the desired silicon diimide reaction product solids. The silicon diimide polymerizes and precipitates from the ammonia solution. The ammonium chloride triammoniate remains soluble and is separated typically by repeatedly washing the polymeric silicon diimide with liquid ammonia. The polymeric silicon diimide may then be dried by evaporating the ammonia.

In that regard, while not wishing to be bound by theory, the following discussion will assume the following reaction in the production of such silicon nitride precursor solids:

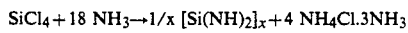

wherein x typically is understood to have a value much greater than one to designate the polymeric nature of the diimide. The silicon imide precursor solid, specifically, the polymeric silicon imide, is listed in Chemical Abstracts under number 29696-97-7 (Silanediimine, homopolymer), although there may also be a listing at Chemical Abstracts number 17022-99-0 (Silanediimine, monomer). Silicon nitride is formed by decomposition of the precursor, preferably by thermal decomposition performed anaerobically and in the absence of chlorine. Again, while not wishing to be bound by theory, the reaction chemistry is understood to be:

Nitrogen and hydrogen gases may replace the ammonia at high temperatures.

The following glossary is provided for convenience of reference in the following discussion.

Ammonia; anhydrous ammonia; $NH_3$
1) compound: Chem. Abstracts Reg. No. 7664-41-7
2) liquid ammonia Ammonium chloride; by-product chloride; wastage (certain instances); $NH_4Cl$
1) compound: Chem. Abstracts Reg. No. 12125-02-9

Ammonium chloride triammoniate; $NH_4Cl.3NH_3$
1) compound: Chem. Abstracts Reg. No. 12394-36-4

Decomposition product; calcine product; product; final product
1) silicon nitride powder recovered after high temperature decomposition of imide intermediate Intermediate product; reaction product; product (certain instances); imide intermediate; silicon nitride precursor; silicon diimide; imide; silanediimine; $[Si(NH)_2]_x$
1) compound: Chem. Abstracts Reg. No. 17022-99-0 or Reg. No. 29696-97-7
2) powder product from reaction of silicon halide, e.g., $SiCl_4$, with $NH_3$; can be thermally treated to form silicon nitride Silicon nitride; nitride; $Si_3N_4$
1) compound: Chem. Abstracts Reg. No. 12033-89-5
2) composition of matter with the compound as principal constituent and tetrahedral bonding similar to diamond
3) a polycrystalline ceramic with an interlocking microstructure formed during thermal processing which leads to high toughness and hardness Silicon tetrachloride; tetrachlorosilane; $SiCl_4$
1) compound: Chem. Abstracts Reg. No. 10026-04-7

Vapor-$SiCl_4$—liquid-ammonia process; vapor-liquid process
1) process in which $SiCl_4$ vapor in an inert carrier gas contacts liquid ammonia.

As noted above, the present invention is especially advantageous in the production of silicon nitride precursor solids. In one particularly preferred embodiment of such application of the invention, silicon halide, most preferably silicon tetrachloride, is used as a first reactant due to its relatively low cost, commodity status and the relative ease of purification and by-product separation in the reaction scheme. In fact, it is a special feature of the vapor-chloride — liquid-ammonia process that the silicon reactant is input to the reactor vessel in the vapor form. Specifically, a saturator can be used to convert liquid silicon tetrachloride to the vapor form in mixture with an inert carrier gas, preferably argon or nitrogen. A controlled flow rate carrier gas stream can be saturated with $SiCl_4$ by bubbling it through the liquid at or slightly below room temperature. The resultant gas stream is then diluted with a bypass flow stream (that is, an additional feed of carrier gas which bypasses the saturator) to form a final reactant feed gas stream which is slightly undersaturated at the reactor temperature. This undersaturation can aid in avoiding condensation of liquid $SiCl_4$ at the reactor inlet. The nitrogen or other carrier gas streams preferably are controlled by mass flow controllers essentially independent of system pressure. During operation, a slight drop in saturator temperature may be observed, reflecting the heat of vaporization of the $SiCl_4$.

The $SiCl_4$ feed stock preferably is purified through distillation, chelation or absorption for volatile dissolved chlorides, and submicron filtration of particulate matter. Suitable techniques are taught, for example, in J. W. Mitchell and J. E. Kessler, "Purification of Optical Wave Guide Glass Forming Reagents: Phosphorous Oxychloride," *J. Electrochem. Soc.*, 131 [2] 361-65 (1984), which teaching is incorporated herein by reference. There is also, effectively, an additional distillation in the saturator. There is also an opportunity for final microfiltration of entrained fine solid chlorides and oxides before entry of the reactant feed gas into the reactor vessel. It is within the ability of those skilled in the art to determine a suitable volume of carrier gas, which is a function of the vapor pressure and the total system pressure. The volume is calculated as part of the overall mass balance of the reaction scheme. Typically, operation of the reactor vessel above $-20°$ C. is preferred to limit the amount of carrier gas required. The carrier gas preferably is nitrogen derived from liquid nitrogen. Typically, the oxygen and hydrocarbon purity of such carrier gas is sufficient for use for reactor temperatures close to room temperature.

Notwithstanding that the $SiCl_4$—$NH_3$ reaction is ordinarily exothermic, the "vapor-chloride — liquid-ammonia" process can be net endothermic or heat-neutral. The exothermic chloride-ammonia reaction can be more than offset at $0°$ C. by latent heat of vaporization of $NH_3$ into the carrier gas. By operation at temperatures near room temperature, the net endotherm can approach zero, thereby minimizing potential problems in scaling the production process. In any event, those skilled in the art will recognize that control of reaction heat yield is important for process scale-up, since heat transfer for a given reactor geometry is a function of heat transfer surface to volume ratio. In this regard, the teachings presented in G. M. Crosbie et al, "Synthesis of High Purity Sinterable $Si_3N_4$ Powders", Oak Ridge National Laboratory Publication ORNL/Sub/85-SB012/1, which is available from the National Technical Information Service, U.S. Department of Commerce, is incorporated herein by reference. Most significant in this regard, with respect to the preferred embodiment of the invention under discussion, is that the use of an inert carrier gas in the silicon halide reactant feed gas assists in maintaining the reactor at or below about room temperature by the latent heat of vaporization of liquid ammonia into the carrier gas. That is, as noted above, the latent heat of vaporization of ammonia to establish its partial pressure in the carrier gas can substantially offset the exothermic heat of the imide-forming reaction. As explained further below, the presence of condensable ammonia vapor in the gaseous outflow of residual carrier gas from the reactor vessel plays a critical role in recovering silicon nitride precursor solids entrained in the gaseous outflow.

Referring now specifically to the drawings, the apparatus 10 shown schematically in FIG. 1 includes a reactor vessel 12 comprising agitator means 14. As now described in detail, the apparatus, and the method for its use, are for producing silicon nitride precursor powders, specifically, silicon diimide, $Si(NH)_2$. A quantity of liquid ammonia is fed through line 16 to reactor vessel 12. In the embodiment illustrated, valve 17 is opened, valve 18 is closed and the proper amount of ammonia is charged to ammonia metering tank 19. Thereafter, valve 17 is closed and valve 18 is opened, allowing the liquid ammonia to run through line 16 to vertical column or stack 20 to reactor vessel 12. Those skilled in the art will recognize alternative suitable means for metering a proper charge of liquid ammonia to the reactor vessel 12. Thus, for example, rather than ammonia metering tank 19, weighing means for measuring the liquid ammonia charge may be employed in accordance with devices and methods known in the art.

Prior to charging liquid ammonia to the reactor vessel, the system preferably is evacuated. This is found to improve the purity of the product by reducing contaminants in the system. For this purpose, vacuum line 11 is connected to a vacuum pump. Valve 13 is opened during evacuation pumping and subsequently closed prior to charging ammonia to the reactor vessel 12.

Liquid $SiCl_4$ is provided in saturator 22. To establish a correct and steady flow of the silicon chloride reactant feed gas, valve 23 is closed and valves 24, 25 and 26 are opened. Nitrogen or other inert carrier gas is fed through line 27. Silicon tetrachloride vapors are generated as the carrier gas bubbles through the saturator, which is a packed bed filled with liquid silicon tetrachloride. The silicon tetrachloride preferably is of electronic grade, available, for example, from Solkatronic Chemicals, Inc., Fairfield, N.J. The stream from the saturator flows to a mixing chamber 21 above the saturator, where it is combined with a by-pass gas flow, that is, additional carrier gas, to prevent supersaturation at the lower temperature of the reactor. Preferably, the saturator is operated at room temperature to prevent moisture condensation on the separator from ambient air. This reduces the possibility of corrosion due to the mixture of condensed moisture with any leakage of silicon chloride from the separator. Carrier gas, saturated with the silicon chloride or other silicon halide reactant, may be mixed with an additional portion of carrier gas via line 28. The amount of additional carrier gas should be sufficient to prevent any substantial condensation of silicon chloride at the reactor vessel operating temperature. When a steady flow has been established, its flow to wastage is stopped by closing valve 24 and substantially simultaneously opening valve 23.

The reactant gas feed line 29 preferably includes a downwardly extending tube within reactor vessel 12 or other means for discharging the reactant feed gas below level 30 of the liquid ammonia previously charged to the reactor vessel. In this regard, the teachings of U.S. Pat. No. 4,196,178 are incorporated herein by reference. This feature is found to substantially eliminate solids formation at the end of the reactant gas feed line and to provide good reactant mixing, especially in view of the agitator means 14 preferably operating within the reactor vessel 12.

The reactant feed gas preferably is fed to the reactor vessel continuously over a period of time as the reaction to produce the silicon diimide is ongoing. From the above discussion it will be appreciated that the reactor vessel operates under pressure, such that the ongoing flow of reactant feed gas causes the aforesaid gaseous outflow from the reactor vessel. Those skilled in the art will also recognize that operation of the reactor under pressure is particularly advantageous in the context of the preferred embodiment of the invention illustrated in FIG. 1 for the production of silicon nitride precursor. In that context, the reactor vessel preferably is operated at or above 35 psig, more preferably in the range of 35 to 250 psig.

The carrier gas is exhausted from the reactor vessel via vertical stack 20. As noted above, a certain amount of liquid ammonia vaporizes into the carrier gas during the reaction. The gaseous outflow from the reaction situs during the reaction, in addition to comprising residual carrier gas and vaporized ammonia, also has been found to entrain a substantial amount of silicon diimide solids being formed in the reaction. Loss of this reaction product would reduce the effective yield of the production process. In accordance with the present invention this loss is substantially reduced. Specifically, the presence in the gaseous outflow of a condensable vapor, that is, ammonia vapor, is advantageously employed to recover the entrained silicon diimide solids. More specifically, a static mixer heat exchanger 32 is included in vertical stack 20 through which the gaseous outflow passes from the reactor vessel 12.

Figure 2:
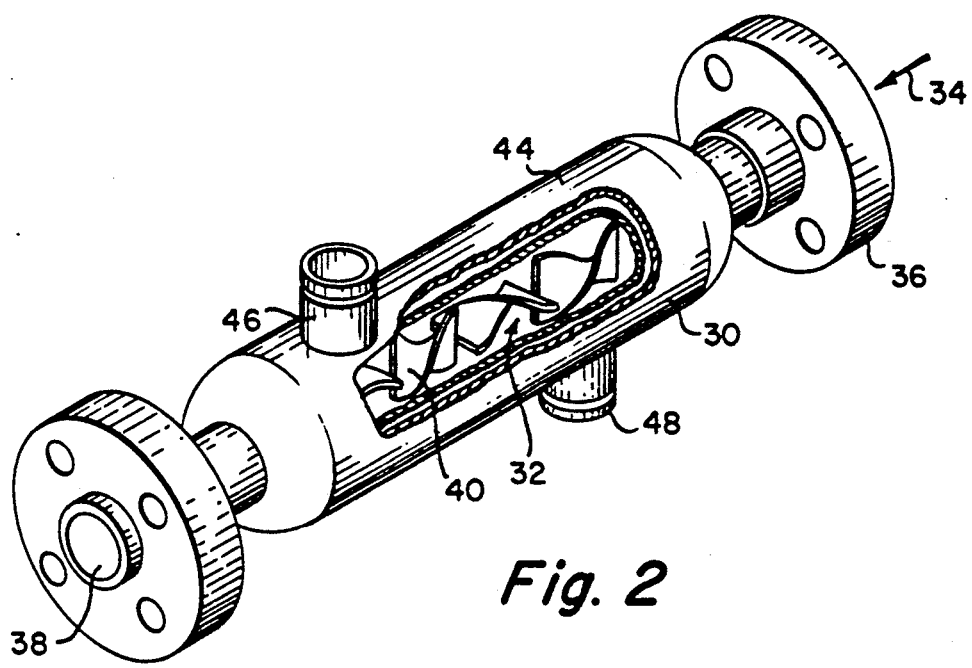
FIG. 2 is an enlarged perspective view of a static mixer heat exchanger suitable for use in the apparatus of the preferred embodiment of FIG. 1.

Static mixer heat exchangers are known to those skilled in the art. Static mixers are understood by those skilled in the art to be devices wherein fluid media are forced to mix themselves through a progression of divisions and recombinations, typically with $2^n$ layerings per n elements. Such devices typically require no moving parts and, accordingly, maintenance and operating costs typically are extremely low. Control means typically are not required for controlling fluid flow through a static mixer. The energy for mixing or, in the case of the present invention, for bringing the gaseous outflow into contact with the static mixer surfaces (as further described below), is provided by the pressure under which the fluid flows through the static mixer. Typically, the pressure drop across the static mixer is low. Static mixer heat exchangers may employ a water jacket, as seen in the embodiment of FIG. 2, for example, although alternative embodiments may employ cooling fluid channels in the gas flow path, e.g., through the interior of the static mixer elements. Static mixer heat exchangers suitable for the present invention are commercially available, for example, from Kenics Corp., North Andover, Mass. Static mixers are discussed in Chemical Engineers' Handbook, 5th Edition, McGraw-Hill Book Company, §19, p. 32.

Figure 3:
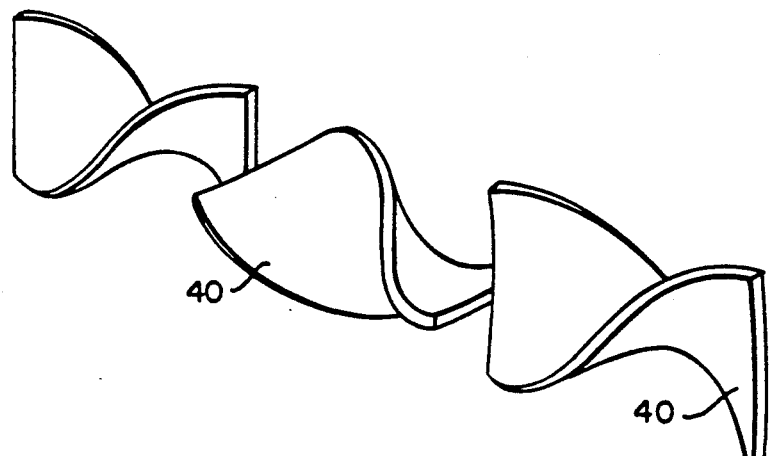
FIG. 3 is an enlarged perspective view of the static mixer means disposed in the flow path of the cooling chamber of the static mixer heat exchanger of FIG. 2.

In the preferred embodiment of FIGS. 1-3, the static mixer heat exchanger 30 comprises a static mixer cooling chamber 32 which defines a flow path for the gaseous outflow in the direction of arrow 24 between inlet 36 and outlet 38. The static mixer heat exchanger further comprises static mixer surfaces 40 disposed in the flow path 32. As best seen in FIG. 3, the static mixer surfaces preferably consist of alternate-hand helix-approximating elements juxtaposed at 90° to one another in series in the flow path. Alternative suitable designs for the static mixer surfaces 40 within the cooling chamber 32 of the static mixer heat exchanger 30 will be apparent to those skilled in the art in view of the present disclosure.

The static mixer heat exchanger 30, as illustrated in FIG. 2, may further comprise a cooling jacket 44. Cooling fluid, such as water or more preferably anhydrous alcohol, is fed via inlet 46 to surround the static mixing cooling chamber 32, exiting via outlet 48. Fluid feed and exhaust lines (not shown) can be connected to inlet 46 and outlet 48 in a usual manner.

Vertical stack 20 is seen to further comprise fluid communication means 50 for communicating gaseous outflow from the reactor vessel to the static mixer heat exchanger 30. Fluid communication means 50 comprises a vertical tubular conduit with a view port 52.

In operation, during the production of silicon diimide, reactant feed gas enters in the manner described above via feed tube 29 and gaseous outflow comprising residual carrier gas, ammonia vapor and entrained reaction product solids are exhausted from the reactor vessel via vertical stack 20. In passing through the cooling chamber of static mixer heat exchanger 30, the liquid ammonia is condensed on the static mixer surfaces. As best seen in FIG. 2, the static mixer surfaces are in contact with the inner shell which defines the flow path for the gaseous outflow. Being heat conductive, the static mixer elements are at reduced temperature by operation of the cooling means of the static mixer heat exchanger, specifically, the cooling jacket 44. Those skilled in the art, in view of the present discussion, will recognize that reference herein to operation of the static mixer heat exchanger at a "reduced temperature" means that the static mixer heat exchanger, more specifically the static mixer surfaces disposed within the cooling chamber thereof, are maintained at a temperature less than that at which the gaseous outflow exits the reaction vessel. More specifically, the "reduced temperature" is low enough to condense onto the static mixer surfaces at least one condensable vapor or gas comprising the gaseous outflow from the reactor vessel. In the case of the preferred embodiment of FIG. 1, wherein the gaseous outflow comprises nitrogen or other inert carrier gas and ammonia vapor (along with the entrained reaction product solids) the temperature should be at or below the condensation temperature of the ammonia. Since the vapor pressure is a function of temperature, the preferred condensor temperature depends upon the reactor temperature used in a particular operation. To minimize ammonia loss through the static mixer heat exchanger, the preferred condensor temperature is at least 20° C. below that of the reactor exit temperature. That is, the static mixer surfaces preferably are maintained at or below that "condensor temperature". It will be apparent to those skilled in the art that in alternative embodiments of the invention the requisite temperature will vary, depending on the condensation temperature of the condensable gas or gases of which a particular gaseous outflow is comprised.

In the particularly preferred embodiment illustrated in FIG. 1, the condensate, with reaction production solids captured therein, is collected simply by being returned to the reactor vessel. Those skilled in the art will recognize that the condensate and solids may be "collected" by either a batch or continuous flow return to the reaction situs or to some other place for additional processing, etc. The vertical arrangement of stack 20 (and other arrangements offset from vertical, but at an elevation above the reactor vessel) allows the return flow to the reactor vessel to be accomplished by simple action of gravity upon the condensate. Thus, the preferred embodiment illustrated represents a particularly elegant advance in the art, especially in that no control means or moving parts are required for collecting and returning the recovered solids to the reactor vessel, and also in that the condensate is a reactant and, therefore, is also advantageously returned to the reactor vessel. In view of the present discussion, those skilled in the art will appreciate that in various embodiments of the invention the condensate with captured solids therein may not be returned to a reactor vessel but, rather, may be collected separately. Thus, for example, means may be provided for diverting the flow of condensate to a separate holding tank for further processing.

Upon exiting the static mixer heat exchanger, the gaseous outflow passes through condenser 60. Condenser 60 removes additional liquid ammonia and perhaps trace reaction product solids from the residual carrier gas. Optionally, the condenser may comprise an additional static mixer heat exchanger, although the economic advantage of an additional static mixer heat exchanger will depend upon the particular production process involved. Any additional ammonia which is condensed, and any trace reaction product solids captured thereby, may be returned downwardly through stack 20 by force of gravity. The residual carrier gas exiting via line 62 at the top of condenser 60 is passed to backpressure valve 54, which may also comprise a filter. In the embodiment of FIG. 1, the backpressure valve 54 may be employed to control overall system pressure. Line 56 exiting backpressure valve 54 typically will exit to a scrubber or the like and then to the atmosphere.

Valve 64 is normally closed during the reaction. Upon completion of the reaction, the reactant feed gas is stopped. Agitation is stopped and silicon diimide solids settle in the reactor vessel. Supernatant liquid may be decanted from the reactor vessel via decantation line 70 to wastage tank 72 by opening valve 64. The rate of decantation can be controlled by controlling pressure differential between the wastage tank 72 and the reactor vessel 12 via pressure equalization line 74. The depth of dip tube 65 is adjusted to select the proportion of supernatant withdrawn and the fraction of reaction product solids carried off to the wastage tank 72. Wastage tank 72 is vented through waste backpressure valve 76. In addition, decantation can be advanced by feeding nitrogen or other inert gas to the reactor vessel 12 via pressure line 78 during decantation. Optionally the reaction product is rinsed, followed by additional decanting. In addition to, or as an alternative to, decantation for the separation of imide from liquid ammonia which contains the by-product $NH_4Cl$, a decanting centrifuge may be used. Additional suitable methods for the liquids/solids separation include centrifuge, filter, flash evaporation, etc. Valve 80 and pressure line 78 are normally closed during the reaction step.

The decantation step leaves in the reactor a portion of the original mixture which now is rich in silicon diimide precursor solids. The remaining liquid comprises primarily unreacted $NH_3$ and $NH_4Cl$ by-product. This reaction product enriched mixture is extracted from the reactor vessel for further processing to separate and purify the reaction product solids which then can be converted to silicon nitride powder suitable for the manufacture of components, for example, motor vehicle engine components or the like. Such conversion of the silicon diimide reaction product solids to silicon nitride is typically accomplished by two stage thermal decomposition according to methods and apparatus well known to those skilled in the art. The extraction of the solids rich mixture from the reactor is accomplished, in accordance with the preferred embodiment illustrated in FIG. 1, by actuation of cylinder valve 82 by means of ram type valve actuator 84. Opening cylinder valve 82 allows the mixture to flow by gravity from reactor vessel 12 to intermediate product tank 86 via fluid communication line 88. Viewing window 90 in line 88 allows visual confirmation that the flow from the reactor to the intermediate product tank has been accomplished. Backpressure valve 92 fitted to intermediate product tank 86 assists in controlling the pressure drop in the intermediate product tank 86. The slurry is chilled by $NH_3$ venting to a scrubber to reduce the pressure in the vessel and thereby induce $NH_3$ evaporation. The chilled mixture may then be transferred by gravity flow to a ceramic decomposition tube via the pair of valves 87.

The apparatus illustrated in FIGS. 1 through 3 is adapted for semi-continuous operation in that liquid ammonia is loaded batch-wise and the silicon halide reactant feed gas flows continuously to the reactor during the reaction. Those skilled in the art will readily appreciate in view of this disclosure that the invention is equally applicable to continuous reaction processes whenever a gaseous outflow from the reactor vessel entrains reaction product solids and has a condensable vapor or gas species in sufficient quantity to wet static mixer surfaces adequately to recapture such entrained solids.

The imide reaction product solids is suitable for two stage thermal decomposition to silicon nitride, the first stage optionally being fluidized bed processing. Fast heating on injection into a fluidized bed would likely aid in the removable of chloride residues with least product losses. The silicon imide precursor is likely used immediately to make silicon nitride in view of its sensitivity to exposure to air and its resultant degradation over time. Recycled gas streams could be used as fluidizing gas. Specifically, gaseous outflow form the reactor vessel, after being processed through the above mentioned static mixer heat exchanger and condenser, may be used as fluidizing gas in a fluidized bed employed for thermal decomposition of silicon imide reaction product to silicon nitride. In this regard the teachings of U.S. Pat. No. 4,859,443 to Marosi regarding a process of producing silicon nitride in a fluidized bed of gaseous ammonia is incorporated herein by reference. Fluidizing gas flowing from the fluid bed can be passed to a cooler/condenser and/or spray tower to recover product solids entrained in the gas. Liquid ammonia can be used for washing in the spray tower. Material which might otherwise be lost product is recovered and coarsened by a second passage through the washing stage. It appears that a minimum fluidization velocity in the fluid bed may be on the order of 2.8 cm/sec. The fluidized bed may also contain a cyclone separator to remove silicon diimide from fluidizing gas, or other gas/solids separator means in accordance with techniques and equipment well known to those skilled in the art. In regard to a process of calcining silicon diimide to silicon nitride in a fluidized bed of gaseous ammonia, the teaching of U.S. Pat. No. 4,859,443 to Marosi is incorporated herein by reference.

In view of the foregoing disclosure and discussion of preferred embodiments of the invention, those skilled in the art will readily appreciate that the present invention has application to any production process wherein gaseous outflow from a reactor, in which reaction product solids are entrained, comprises a condensable gas or vapor in sufficient quantity to condense on static mixer surfaces adequately to capture a substantial portion of such entrained reaction product solids. Thus, while preferred embodiments of the invention have been illustrated and described, it will be understood that various changes and modifications may be made without departing from the invention, and it is intended to cover in the appended claims all such changes and modifications as fall within the true spirit and scope of the invention.

We claim:

1. A method for collecting solids entrained in a gaseous outflow from a reaction situs during a reaction, the gaseous outflow exiting the reaction situs at an exit temperature and comprising a vapor condensable at a condensation temperature below the exit temperature, the method comprising:

directing the gaseous outflow to an inlet of a static mixer heat exchanger having (a) a cooling chamber defining a flow path between the inlet and an outlet, (b) static mixer surfaces in the flow path for forming a condensate of the condensable vapor, and (c) cooling means for maintaining the static mixer surfaces at a temperature not greater than the condensation temperature; and operating the cooling means to cool the static mixer surfaces to form a condensate of the condensable vapor on the static mixer surfaces, capturing solids from the gaseous outflow in the condensate.

2. The method for collecting solids in accordance with claim 1, further comprising the step of passing the condensate with reaction product solids therein back to the reaction situs.

3. The method for collecting reaction product solids in accordance with claim 2, wherein the condensate with solids therein is passed from the static mixer heat exchanger to the reaction situs by gravity flow through the cooling chamber inlet.

4. The method for collecting reaction product solids in accordance with claim 3 wherein the cooling means comprises a fluid-tight jacket surrounding the cooling chamber and having an inlet and an outlet for a flow of cooling fluid through the jacket, and operating the cooling means comprises passing a flow of cooling fluid through the jacket.

5. The method for collecting solids in accordance with claim 4, wherein the cooling fluid is anhydrous alcohol.

6. The method for collecting solids in accordance with claim 1, wherein the gaseous outflow further comprises carrier gas fed to the reaction situs in a flow of reactant feed gas at a substantially steady rate during the reaction, the temperature at which the static mixer surfaces are maintained being higher than the condensation temperature of the carrier gas.

7. A method of collecting silicon nitride precursor solids entrained in a gaseous outflow from a reaction situs, the gaseous outflow exiting the reaction situs at an exit temperature and comprising a vapor condensable at a condensation temperature below the exit temperature and a substantially inert carrier gas not condensable at the condensation temperature, the method comprising:

passing the gaseous outflow through a static mixer cooling chamber of a static mixer heat exchanger, the static mixer cooling chamber defining a flow path between an inlet and an outlet, the static mixer heat exchanger further comprising static mixer surfaces in the flow path and cooling means for cooling the static mixer surfaces to a temperature not greater than the condensation temperature;

operating the cooling means to form a condensate of the vapor on the static mixer surfaces to capture silicon nitride precursor solids in the condensate; and collecting the condensate and the silicon nitride precursor solids captured therein.

8. The method for collecting silicon, nitride precursor solids in accordance with claim 7, wherein the step of collecting the condensate and the silicon nitride precursor solids captured therein comprises returning them in a substantially continuous flow to an ongoing reaction producing silicon nitride precursor solids at the reaction situs.

9. The method for collecting silicon nitride precursor solids in accordance with claim 8, wherein the reaction situs is pressurized and the gaseous outflow is passed to the static mixer cooling chamber under pressure from the reaction situs.

10. The method for collecting silicon nitride precursor solids in accordance with claim 9, further comprising feeding reactant feed gas comprising silicon halide vapor in the carrier gas to the reaction situs during the reaction, wherein the condensable vapor of the gaseous outflow is ammonia vapor, the condensation temperature being at least 20° C. below the exit temperature.

11. A method of making silicon diimide comprising:
   (a) introducing liquid ammonia into a reaction vessel;
   (b) initiating and maintaining for a period of time a flow into the reaction vessel, at above atmospheric pressure, of reactant feed gas comprising silicon halide vapor in an inert carrier gas, the flow of reactant feed gas passing through a reactant feed inlet tube extending downwardly into the liquid ammonia, to sustain an ongoing reaction between the silicon halide and the ammonia to produce silicon diimide reaction product;
   (c) releasing gaseous outflow from the reactor vessel at an exit temperature through a first reaction product outlet to a static mixer cooling chamber of a static mixer heat exchanger, the gaseous outflow comprising silicon diimide solids entrained in a mixture comprising ammonia vapor and carrier gas, the static mixer cooling chamber defining a flow path for the gaseous outflow between an inlet and an outlet, static mixer surfaces being disposed in the flow path, the static mixer heat exchanger further comprising a cooling means for cooling the static mixer surfaces to form a condensate comprising liquid ammonia on the static mixer surfaces to capture silicon diimide solids therein; and
   (d) returning the condensate and captured silicon diimide solids to the reaction vessel in an ongoing flow during the reaction.

12. The method of making silicon diimide in accordance with claim 11 further comprising forming the reactant feed gas by passing the carrier gas through a saturator charged with liquid silicon halide and then adding additional carrier gas to achieve a reduced saturation level prior to introducing the reactant fee gas into the reaction vessel.

13. The method of making silicon diimide in accordance with claim 12 wherein the silicon halide is $SiCl_4$.

14. The method of making silicon diimide in accordance with claim 11 wherein the cooling means is a cooling jacket surrounding at least a substantial portion of the flow path, the cooling jacket having an inlet and an outlet for a flow of cooling fluid.

15. The method of making silicon diimide in accordance with claim 14 wherein alcohol is flowed through the cooling jacket to maintain the temperature of the static mixer surfaces at least 20° C. below the exit temperature.

16. The method of making silicon diimide in accordance with claim 11 wherein the carrier gas is selected from the group consisting of nitrogen and argon.

17. The method of making silicon diimide in accordance with claim 11 wherein the static mixer surfaces comprise surfaces of alternate-hand helical elements positioned in series in the flow path, each said element being positioned at about 90° to adjacent others.

18. The method of making silicon diimide in accordance with claim 11 further comprising agitating the reactants during the reaction.

19. The method of making silicon diimide in accordance with claim 11 further comprising stopping the flow of reactant feed gas, followed by liquid/solids separation of a reaction product mixture in the reactor vessel to separate silicon diimide solids from at least a portion of residual liquid comprising unreacted ammonia and ammonium halide dissolved therein.

20. The method of making silicon diimide in accordance with claim 19 wherein the molar ratio of liquid ammonia to the ammonium halide in the reaction product mixture is in the range of 18 to 200.

21. The method of making silicon diimide in accordance with claim 19 wherein the liquid/solids separation comprises decanting an upper portion of the residual liquid from the reactor vessel and passing a remaining portion thereafter from the reaction situs to a secondary liquid/solid separation step.

22. The method of making silicon diimide in accordance with claim 21 wherein said passing of the remaining portion of the reaction product mixture from the reaction situs is performed anaerobically and comprises gravitational concentration of silicon nitride solids in a conical zone followed by a transfer from the conical zone along with a reduced portion of the residual liquid to a controlled atmosphere furnace.

23. The method of making silicon diimide in accordance with claim 11 wherein the reaction is carried out in the reactor vessel under pressure of at least 35 psig.

24. The method of making silicon diimide in accordance with claim 23 wherein the pressure is between 35 and 250 psig.

25. The method of making silicon diimide in accordance with claim 11 wherein the reaction is controlled to provide a neutral or net endothermic heat transfer between the carrier gas and the liquid ammonia in the reactor vessel by offsetting exothermic heat of reaction of silicon halide with ammonia by latent heat of evaporization of ammonia into the carrier gas.

26. The method of making silicon diimide in accordance with claim 25 wherein the temperature of the reaction situs during the reaction is maintained in the range of −20° to +40° C.

27. A method of making silicon nitride comprising:
(a) reacting silicon halide vapor with liquid ammonia at a reaction situs in an inert environment having a pressure of at least 35 psig, which environment is effectively devoid of organic contaminants, the reaction producing a mixture of precipitated silicon imide in liquid ammonia having dissolved ammonium halide;
(b) passing a gaseous outflow comprising precipitated silicon imide solids entrained in a mixture of ammonia vapor and substantially inert carrier gas through an outlet port from the reaction situs to an inlet of a static mixer cooling chamber of a static mixer heat exchanger, the static mixer cooling chamber defining a gas flow path between the inlet and an outlet;
(c) collecting silicon imide solids captured in liquid ammonia condensed from ammonia vapor in the gaseous outflow on static mixer surfaces within the gas flow path by operating static mixer cooling means of the static mixer heat exchanger for cooling the static mixer surfaces to a temperature not greater than the condensation temperature of the ammonia vapor;
(d) returning the silicon imide solids captured in liquid ammonia to the reaction situs;
(e) extracting a portion of said mixture from the reaction situs;
(f) separating liquid from silicon imide solids in said portion; and
(g) thermally decomposing the silicon imide solids to silicon nitride.

28. A method of making silicon nitride comprising:
(a) charging liquid ammonia to a reactor vessel having a reactant feed gas inlet port and a gaseous outflow outlet port;
(b) introducing a flow of silicon halide vapor in a substantially inert carrier gas into the liquid ammonia in the reactor vessel under pressure while providing agitation to the liquid ammonia;
(c) controlling reaction between the silicon halide and the liquid ammonia at the reaction situs to provide a neutral or net endothermic heat transfer therebetween, at least in part, by balancing the exothermic reaction against latent heat of vaporization of ammonia into the carrier gas;
(d) passing a gaseous outflow comprising silicon diimide solids entrained in a mixture of ammonia vapor and carrier gas through the outlet port to an inlet of a static mixer cooling chamber of a static mixer heat exchanger, the static mixer cooling chamber defining a flow path between the inlet and an outlet;
(e) collecting silicon imide solids captured in liquid ammonia condensed from ammonia vapor in the gaseous outflow on static mixer surfaces within the gas flow path by operating static mixer cooling means of the static mixer heat exchanger for cooling the static mixer surfaces to a temperature not greater than the condensation temperature of the ammonia vapor;
(f) returning the silicon imide solids captured in liquid ammonia to the reaction situs;
(g) stopping the flow of silicon halide vapor to the reactor vessel and anaerobically transferring silicon imide solids in residual liquid to a liquid/solids separation situs and there separating liquid from the silicon imide solids; and
(h) thermally decomposing the silicon imide solids to silicon nitride.

29. The method of making silicon nitride in accordance with claim 28 wherein the silicon imide is thermally decomposed to silicon nitride in a fluidized bed.

* * * * *